(12) United States Patent
Adams et al.

(10) Patent No.: US 11,304,372 B2
(45) Date of Patent: Apr. 19, 2022

(54) AUTOMATIC BALE STRAPPING MECHANISM

(71) Applicant: C & M Baling Systems, Inc., Winston-Salem, NC (US)

(72) Inventors: Raymond Clyde Adams, Myrtle Beach, SC (US); Wesley Allen Morgan, New London, NC (US)

(73) Assignee: C & M Baling Systems, Inc., Winston-Salem, NC (US)

( * ) Notice: Subject to any disclaimer, the term of this patent is extended or adjusted under 35 U.S.C. 154(b) by 0 days.

(21) Appl. No.: 16/785,445

(22) Filed: Feb. 7, 2020

(65) Prior Publication Data

US 2021/0243961 A1    Aug. 12, 2021

(51) Int. Cl.

| A01F 15/04 | (2006.01) |
|---|---|
| A01F 15/14 | (2006.01) |
| A01F 15/10 | (2006.01) |
| B30B 9/30 | (2006.01) |
| B65B 27/12 | (2006.01) |
| B65B 13/08 | (2006.01) |

(52) U.S. Cl.
CPC ............ *A01F 15/14* (2013.01); *A01F 15/046* (2013.01); *A01F 15/10* (2013.01); *B30B 9/301* (2013.01); *B30B 9/3035* (2013.01); *B65B 13/08* (2013.01); *B65B 27/12* (2013.01); *A01F 2015/108* (2013.01)

(58) Field of Classification Search
CPC ......... B65B 27/12; B65B 13/06; B65B 13/16; B65B 13/08; B65B 13/20; A01F 15/04; A01F 15/10; A01F 15/14; A01F 15/046; A01F 15/0825; A01F 2015/107; A01F 2015/108; B30B 9/301; B30B 9/3035; B30B 9/3025; B30B 9/3032
See application file for complete search history.

(56) References Cited

U.S. PATENT DOCUMENTS

| 257,152 A | 5/1882 | Dederick |
|---|---|---|
| 446,600 A | 2/1891 | Kochs |
| 1,631,881 A | 6/1927 | Murray |
| 1,871,885 A | 8/1932 | Howard |
| 2,576,784 A | 11/1951 | Galen |
| 2,699,107 A | 1/1955 | Strauss |

(Continued)

FOREIGN PATENT DOCUMENTS

FR          1452789 A        4/1996

*Primary Examiner* — Jimmy T Nguyen
(74) *Attorney, Agent, or Firm* — FisherBroyles, LLP

(57) ABSTRACT

The present invention relates to an automatic bale strapping mechanism for dispensing, cutting, and securing strapping material around a bale of material being formed by a baling press. The automatic bale strapping mechanism can be an integral component or series of components to a conventional baling press. The bale strapping mechanism includes a draw and cutter assembly comprising a mobile draw carriage that draws strapping material a predetermined distance for cutting. The bale strapping mechanism can also include a dispensing mechanism which dispenses strapping material and an insertion assembly which carries strapping material through an extrusion chamber chute of a baling press. Methods of automatically drawing and cutting strapping material are also an aspect of the present invention.

22 Claims, 14 Drawing Sheets

(56) References Cited

U.S. PATENT DOCUMENTS

| | | | |
|---|---|---|---|
| 2,823,603 A | 2/1958 | Collins | |
| 2,879,709 A | 3/1959 | Nelson | |
| 2,770,184 A | 4/1959 | Nelson | |
| 2,882,813 A | 4/1959 | Nelson | |
| 3,024,719 A | 3/1962 | Englund | |
| 3,212,434 A | 10/1965 | Raab | |
| 3,241,790 A | 3/1966 | Hudgins | |
| 3,350,999 A | 11/1967 | Morse | |
| 3,424,081 A | 1/1969 | Hoke | |
| 3,543,675 A * | 12/1970 | Angarola | B65B 13/24 100/17 |
| 3,667,377 A * | 6/1972 | Persson | B65B 13/28 100/19 R |
| 3,918,358 A * | 11/1975 | Burford | B65B 27/12 100/19 R |
| 3,994,192 A | 11/1976 | Faig | |
| 4,120,238 A * | 10/1978 | Schafer | A01F 15/146 100/11 |
| 4,354,430 A | 10/1982 | Horiuchi | |
| 4,489,648 A | 12/1984 | Naaktgeboren | |
| 4,565,123 A | 1/1986 | Sanders | |
| 4,718,336 A * | 1/1988 | Munro | B65B 27/12 100/11 |
| 4,850,087 A | 7/1989 | Gronau | |
| 5,009,062 A | 4/1991 | Urich | |
| 5,052,098 A | 10/1991 | Thumm | |
| 5,299,407 A | 4/1994 | Schuttler | |
| 5,365,838 A | 11/1994 | Valentini | |
| 5,509,671 A | 4/1996 | Campbell | |
| 5,735,199 A | 4/1998 | Esau | |
| 6,393,688 B1 | 5/2002 | Axner | |
| 6,986,233 B1 | 1/2006 | Covington | |
| 7,690,297 B1 | 4/2010 | Sagen | |
| 7,975,607 B2 | 7/2011 | Hoover | |
| 10,306,839 B2 | 6/2019 | Adams | |
| 2005/0211111 A1 | 9/2005 | Ropers | |
| 2006/0038053 A1 | 2/2006 | Giovannoni | |
| 2009/0223388 A1 | 9/2009 | Doyle | |
| 2009/0272282 A1 | 11/2009 | Fortier | |
| 2014/0306054 A1 | 10/2014 | Termanas | |
| 2015/0313087 A1 | 11/2015 | Acimas | |
| 2016/0290798 A1 | 10/2016 | Verhaeghe | |

* cited by examiner

AUTOMATIC BALE STRAPPING MECHANISM

FIELD

The invention relates to an automatic bale strapping mechanism for dispensing, cutting, and securing strapping material around a bale of solid material being formed by a baling press. The invention also relates to methods of automatically drawing and cutting strapping material.

BACKGROUND

Baling presses are sophisticated machines which have utility in a variety of industries producing solid material with commercial value, frequently as a waste byproduct of the industrial processes. The solid material is preferably formed into bales by baling presses due to their ease/low cost of transport and compact characteristics. To maintain their compact profile, bales must be bound in some way, for example, with wire or strapping material (metal and/or plastic).

Plastic strapping is often required in the agribusiness (e.g., livestock) field and other fields as well. Plastic strapping may be incinerated with the baled material if need be. There are certain other advantages to plastic strapping such as the width of the straps versus wire—straps being less likely to cut through the bale. Plastic strapping may be cut with a knife blade, but wire cannot. Moreover, workers are more prone to injury from wire than from plastic strapping. Finally, traditional auto-tie mechanisms for horizontal baling presses have used a set of wire spools on both sides of the press and have tied the bale early in the extrusion process. For material, such as cotton gin trash, with less physical memory than other waste material, early tying has proven difficult because the physical size of the bale is reduced and doesn't rebound as with other materials.

One basic weakness of conventional baling presses is the inability to apply plastic strapping in an efficient, cost effective, low man-power manner. U.S. Pat. No. 10,306,839 B2 entitled Bailing Press For Cotton Gin Trash and Other Biomass Feedstock and Methods of Using the Same, which is incorporated by reference as if fully described herein, discloses a unique mechanism and process designed to overcome many of the weaknesses described above. However, a fully automatic mechanism that dispenses the strapping, properly deploys the strapping, draws the strapping to a proper length, and cuts the strapping to size according to the dimensions of the forming bale has not been disclosed.

An automatic bale strapping mechanism that is an integral (or separate and attachable) structural component of a conventional baling press, that is fully automatic, that draws and cuts the strapping material with precision and to a specified length is needed.

SUMMARY

An object of the present invention is to provide a fully automatic bale strapping mechanism that does not require operation by a human worker. The automatic bale strapping mechanism may be an integral component or series of components to a conventional baling press.

In one embodiment, the automatic bale strapping mechanism can include a draw and cutter assembly. In some embodiments, the draw and cutter assembly includes a mobile draw carriage designed to engage the strapping material and draw it a predetermined and adjustable draw distance (D). The draw distance can be based on the desired dimensions of the bale and the length of strapping material necessary for binding the bale. The mobile draw carriage can include a main vertical support or supports.

In another embodiment, the mobile draw carriage includes one or more strapping material transports that contact the strapping material upon proper presentation and transport (or draw) the strapping with the mobile draw carriage to draw distance (D). In one embodiment, the strapping material transport is a vertically oriented roller with non-abrasive surfaces positioned on a shaft or axle. In some embodiments, the roller rotates about the shaft as strapping material is drawn due to movement of the mobile draw carriage to further reduce abrasion. In another embodiment, the strapping material transport is affixed to a post or arm which itself may be affixed to the main vertical support of the mobile draw carriage in such a manner as to permit mechanical vertical movement (up and down) of the post and strapping material transport. In one embodiment, the post is affixed to a slide bar which is slidably engaged to the main vertical support for vertical up and down motion.

In another embodiment, the mobile draw carriage includes one or more cutter assemblies. In some embodiments, the cutter assembly includes a block support for supporting a cutter blade for cutting the strapping material. The cutter blade can be mounted in position on an upper flat surface of the block support. In one embodiment, the cutter blade is housed in an upright orientation within a slot located within said block support. In some embodiments, a top portion of the cutter blade (large enough to fully engage the flat surface of the strapping material) is exposed above the upper surface of the block support and the sharp edge of the cutter blade faces aft—the direction opposite the movement of the advancing and forming bale. In one embodiment, the block support is mounted to the main vertical support of mobile draw carriage and fixed in place (e.g., does not move). In other embodiments, the block support may include additional cutter blade securing structures to hold the cutter blade in position, such as for example, braces and set screws.

In another embodiment, the mobile draw carriage includes a strap retaining block mounted above the cutter blade. The strap retaining block can include a notch on its lower edge within which the top of the cutter blade fits. The notch may contact the top of the cutter blade. In another embodiment, the strap retaining block is pivotably mounted to the mobile draw carriage vertical support. In yet another embodiment, the strap retaining block is fitted with a weight.

The draw and cutter assembly can include one or more carriage tracks which promote planar lateral motion (e.g., horizontal motion) of the mobile draw carriage. In one embodiment, tracks may be positioned on upper and lower horizontal surfaces of a mobile draw carriage frame which define the direction of mobile draw carriage motion. In some embodiments, the mobile draw carriage uses one or more rollers to reduce friction between the mobile draw carriage and the carriage track. In some embodiments, the movement of mobile draw carriage is coplanar with the exterior vertical wall of the extrusion chamber chute of the baling press.

In some embodiments, the post can have a pick-up position (A) along the vertical axis wherein the strapping material transport is slightly above the cutter blade, which is the position that engages the strapping material upon presentation and draws it rearward. The post can have a drop position (B) along the vertical axis wherein the strapping material transport is beneath the upper flat surface of the block support. Movement of the post from (A) to (B) via vertical movement of slide bar upon which said post is affixed in some embodiments causes strapping material to transfer from transport to cutter blade.

In some embodiments, the motion of the mobile draw carriage (via track) and transport support brace (via slide bar) is hydraulically, electrically, or pneumatically powered. For example, movement of said components may be driven by hydraulic cylinders which are attached to the mobile draw carriage and slide bar.

In another embodiment, the automatic bale strapping mechanism includes at least one dispensing mechanism which dispenses strapping material and an insertion assembly which inserts or carries strapping material through an extrusion chamber chute of a baling press. The insertion assembly can include one or more insertor rods or shafts which are driven along a horizontal plane under power through the extrusion chamber chute following pick up of the strapping material and proper placement on the carrying end of the insertor shaft. The carrying end of the insertor shafts can contain a strapping material support which, in some embodiments, includes a trench or trough with a substantially non-abrasive bottom surface in which the strapping material rests while driven through the extrusion chamber chute. The strapping material support can include other structural features designed to substantially confine the strapping material to the trench. In some embodiments, the strapping material support includes a notch which generates sufficient clearance between the strapping material and solid surfaces of the strapping material support for the strapping material transport to properly access the strapping material.

BRIEF DESCRIPTION OF THE FIGURES

Representative embodiments of the invention are disclosed in more detail with reference to the following figures.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete and convey the scope of the invention to those skilled in the art. Among other things, the present invention may be embodied as methods or devices. The following detailed description is, therefore, not to be taken in a limiting sense.

Throughout the specification and claims, the following terms take the meanings explicitly associated herein, unless the context clearly dictates otherwise. The phrase "in one embodiment" or "in some embodiments" or "in a preferred embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. In addition, the phrase "present invention" or "object of the present invention" does not necessarily refer to nor is intended to limit the invention to the specific embodiment or feature described.

In addition, as used herein, the term "or" is an inclusive conjunction and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It should be noted that although the discussions herein may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on designer choice and it is understood that all such variations are within the scope of the invention.

Figure 1:
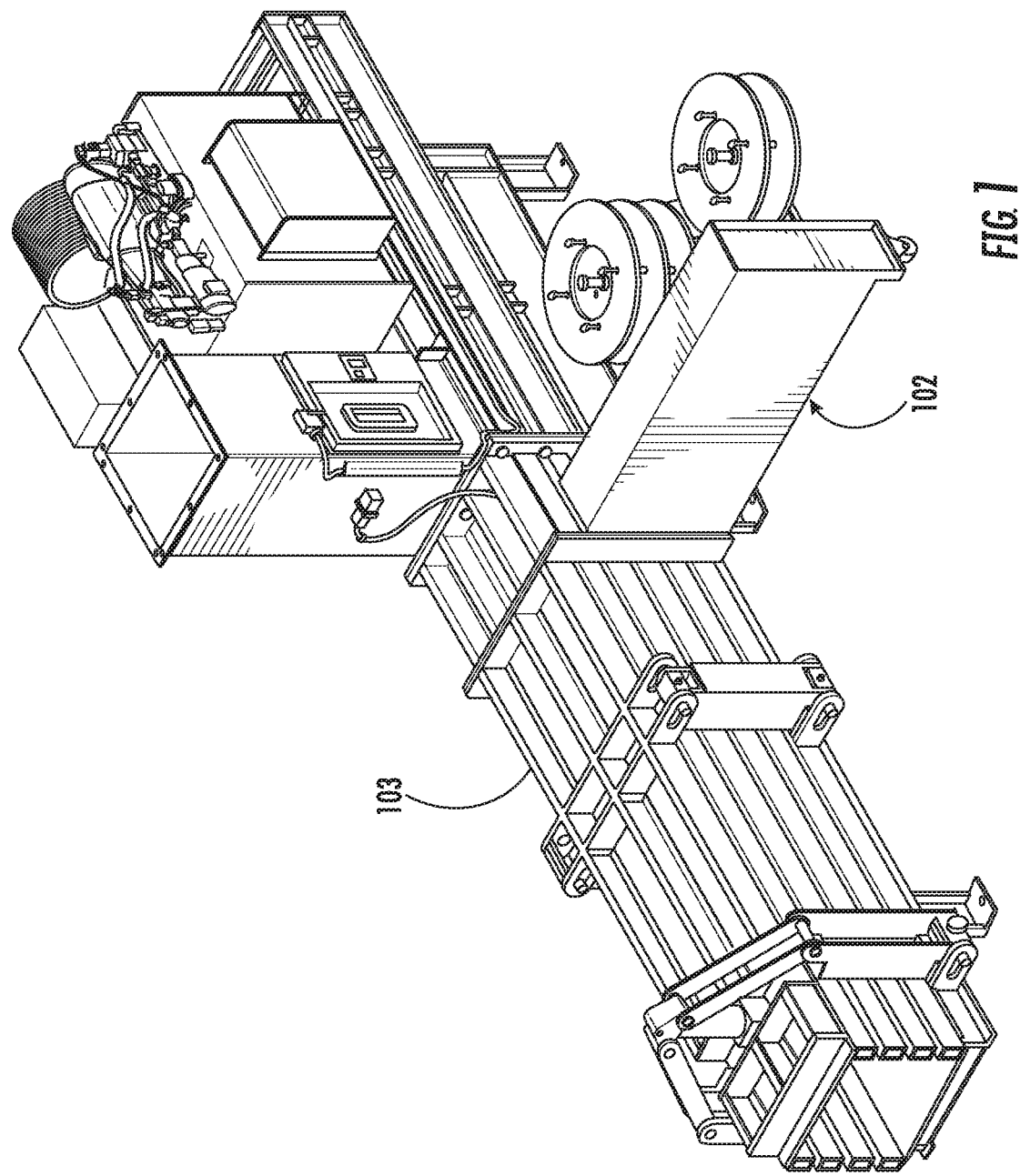
FIG. 1 shows an exemplary baling press illustrating the general locations of components involved in the automatic bale strapping mechanism referenced in the present application including the extrusion chamber chute, exterior walls of the extrusion chamber chute, and the bale strapping insertion assembly.
Figure 3:
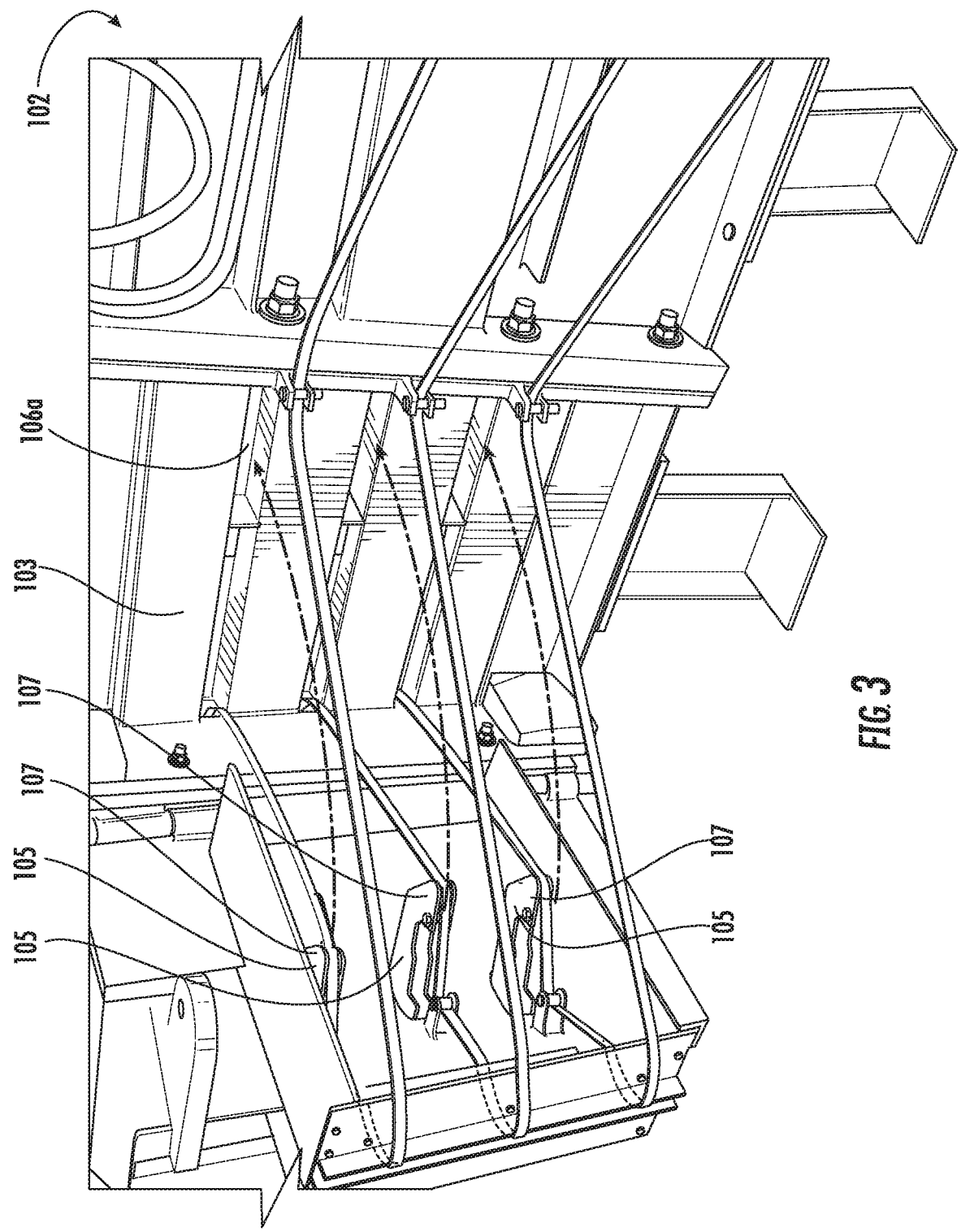
FIG. 3 shows an exemplary open bale strapping insertion assembly illustrating an embodiment of the carrying end of the inserter rods prior to baling press operation and insertion of inserter rods through the extrusion chamber chute.

With reference to FIGS. 1 and 3, in some embodiments the automatic bale strapping mechanism includes a bale strapping insertion assembly 102 for advancing strapping through an extrusion chamber chute 103 and properly presenting the strapping material to the strapping draw and cutter assembly 104 as explained more fully below. In some embodiments, the bale strapping insertion assembly 102 comprises at least one strapping inserter shaft (reference number 105 in FIG. 3) for automatic and mechanical insertion of strapping material, as it is fed or received from a strapping dispensing assembly (not shown), through a channel or aperture 106a (shown in FIG. 3) within the side wall of the extrusion chamber chute 103 and out the second channel or aperture 106b (shown in FIG. 4) in the opposite side wall of the extrusion chamber chute 103. In some embodiments, uncut strapping material is draped across and substantially held in place by the carrying end 107 of the inserter shaft(s) 105 as the inserter shaft(s) force the uncut strapping material through the extrusion chamber chute 103. As the inserter shaft(s) carry the strapping material through the chute, strapping material extends down opposite sides of the inserter shaft(s) due to its uncut state, its interaction with inserter shaft(s), and the dispensing and insertion of strapping on one side of the chute. This feature is important to the generation of two sections (of proper length) of strapping material properly positioned between two adjacent forming bales within the extrusion chamber chute. This is more clearly explained below. When the carrying end of the inserter shaft(s) emerges from the opposite side of the extrusion chamber chute, a small section of the uncut strapping material is presented for cutter assembly operation.

Figure 4:
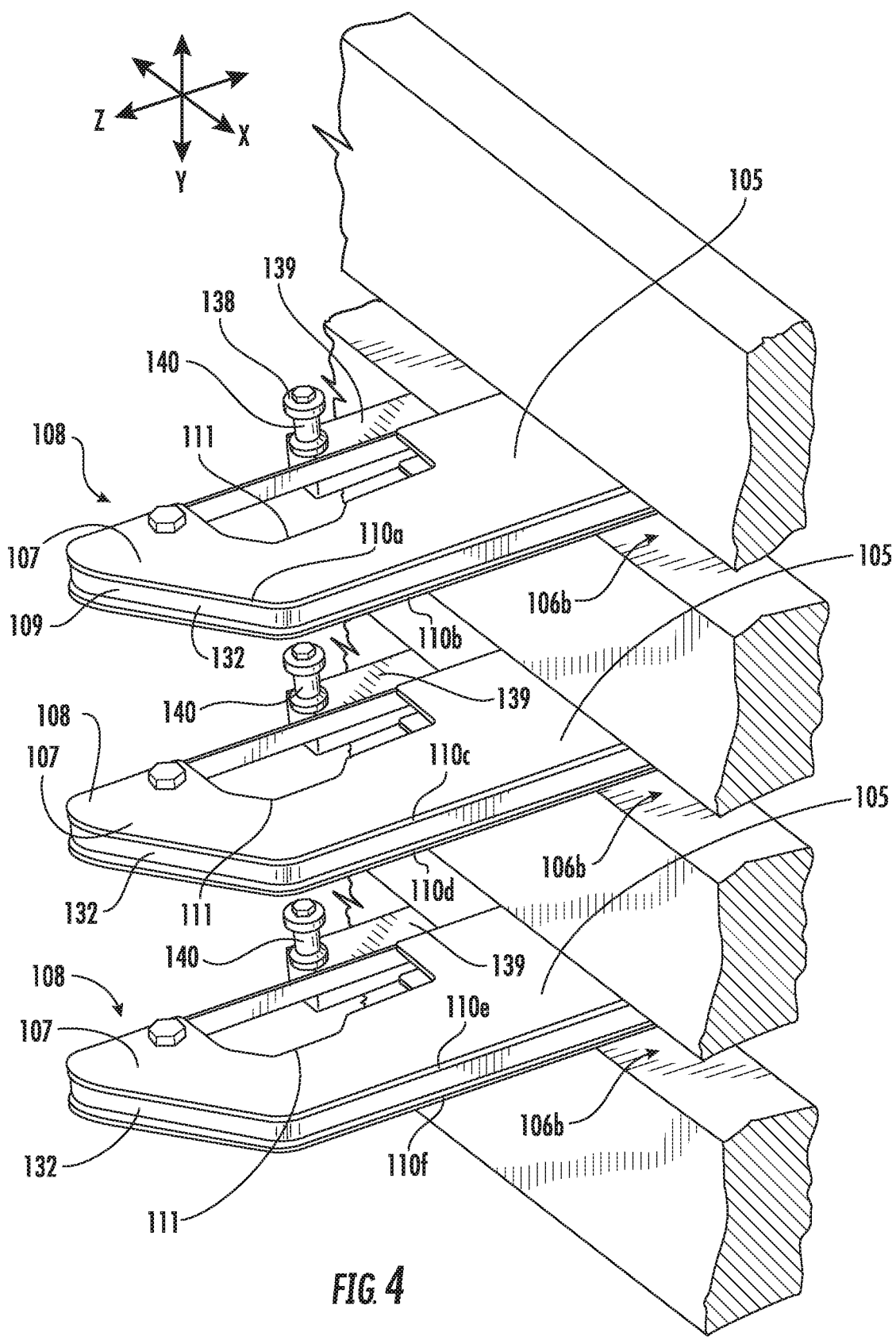
FIG. 4 shows exemplary carrying ends of inserter rods with strapping material following passage of inserter rods carrying strapping material through the extrusion chamber chute.
Figure 5:
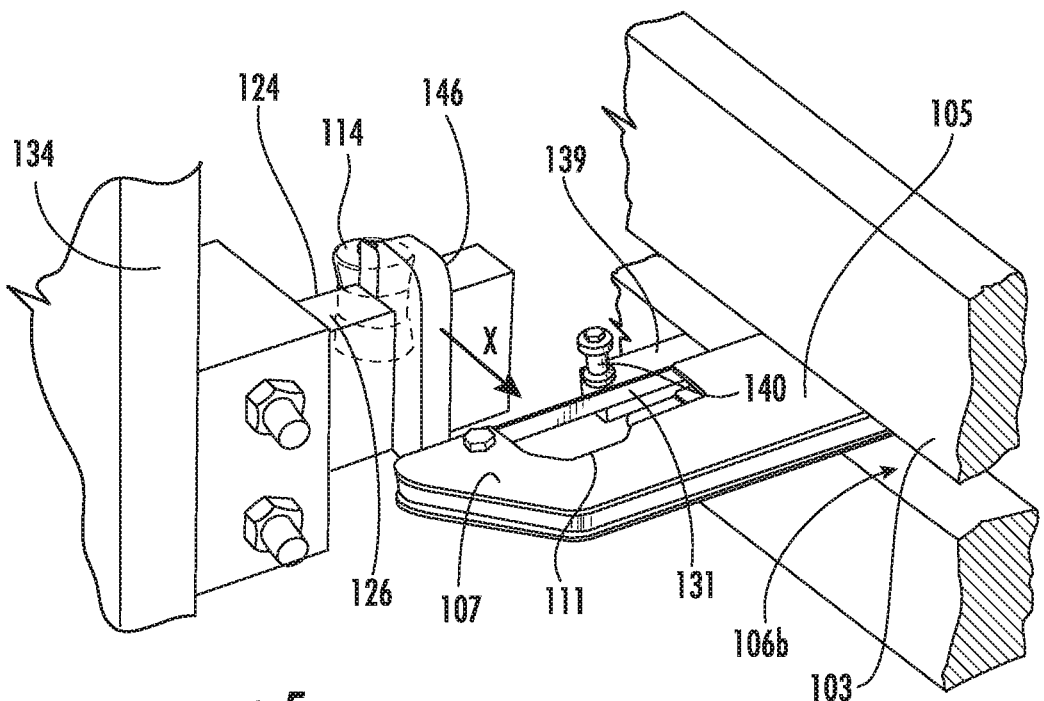
FIG. 5 shows exemplary components of the automatic bale strapping mechanism including the strapping material transport prior to movement toward the carrying end of the inserter rod.

Referring now to the embodiment illustrated in FIG. 4, inserter shaft(s) 105 include a carrying end 107 for receiving and carrying said strapping material through the extrusion chamber chute 103. In some embodiments, said carrying end 107 comprises a strapping material support 108 that properly positions and presents the strapping to the draw mechanism (described in more detail below). In one embodiment, said strapping material support 108 comprises a trench or track 109 that receives and positions the strapping securely to the carrying end 107 of the inserter shafts 105. In one embodiment, the strapping track 109 contains a substantially flat and non-abrasive platform 132 upon which the strapping rests. The strapping material support 108 can contain, in some embodiments, one or more flanking flanges 110a-f that flank the strapping track 109 in order to hold the strapping material in place and prevent the strapping from coming out of position. Other features may be included to further substantially confine the strapping material to the trench 109. In one embodiment, the strapping material support 108 contains a notch 111 exposing the strapping material to the draw and cutter assembly 104 for engagement. The notch 111 generates clearance between the strapping material and the solid surfaces of the strapping material support 108 allowing draw and cutter assembly 104 substantially unobstructed access to the strapping material.

Figure 2:
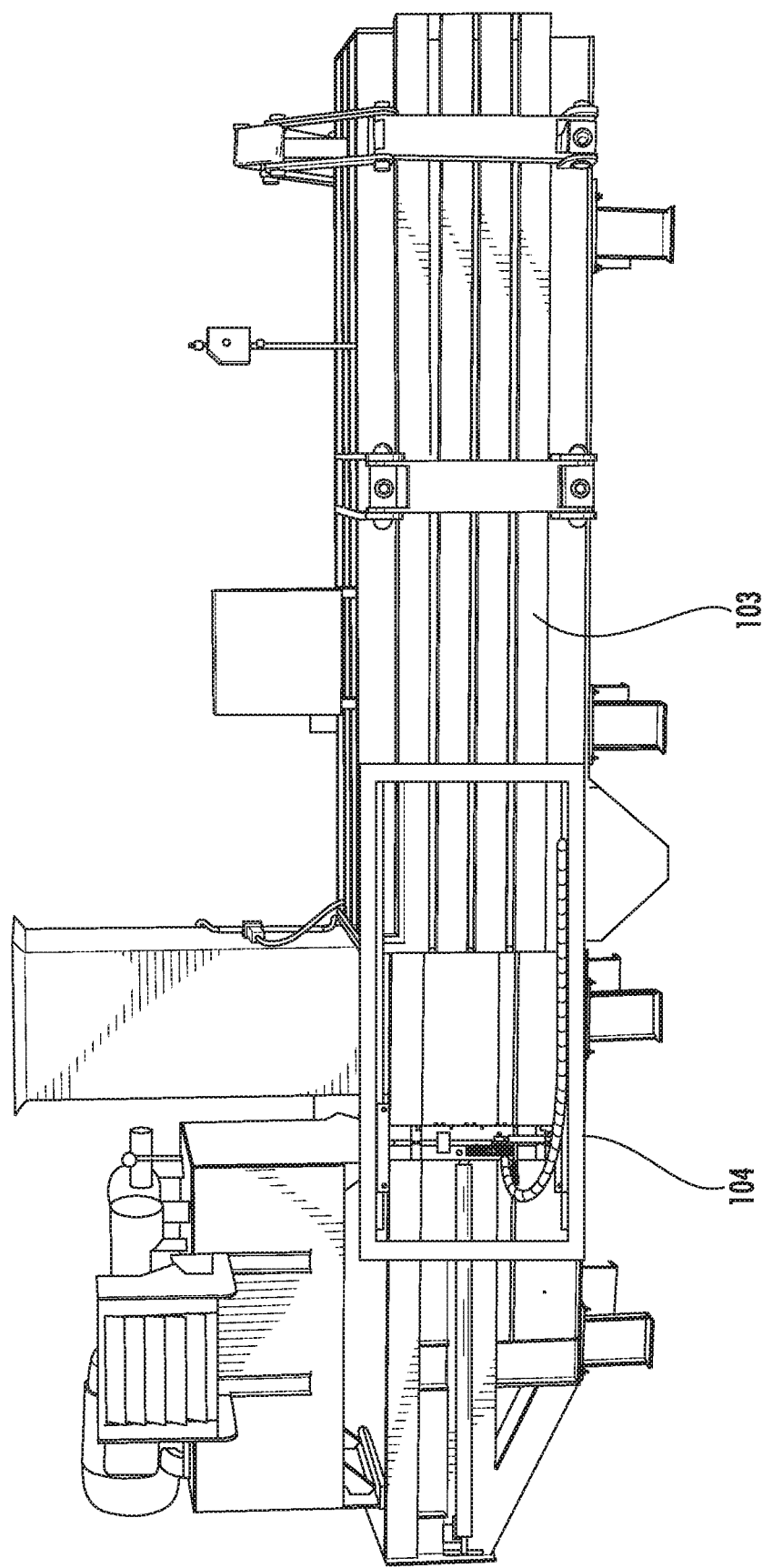
FIG. 2 shows an exemplary baling press illustrating the general locations of components involved in the automatic bale strapping mechanism referenced in the present application including the extrusion chamber chute, exterior walls of the extrusion chamber chute, and the draw and cutter assembly.
Figure 6:
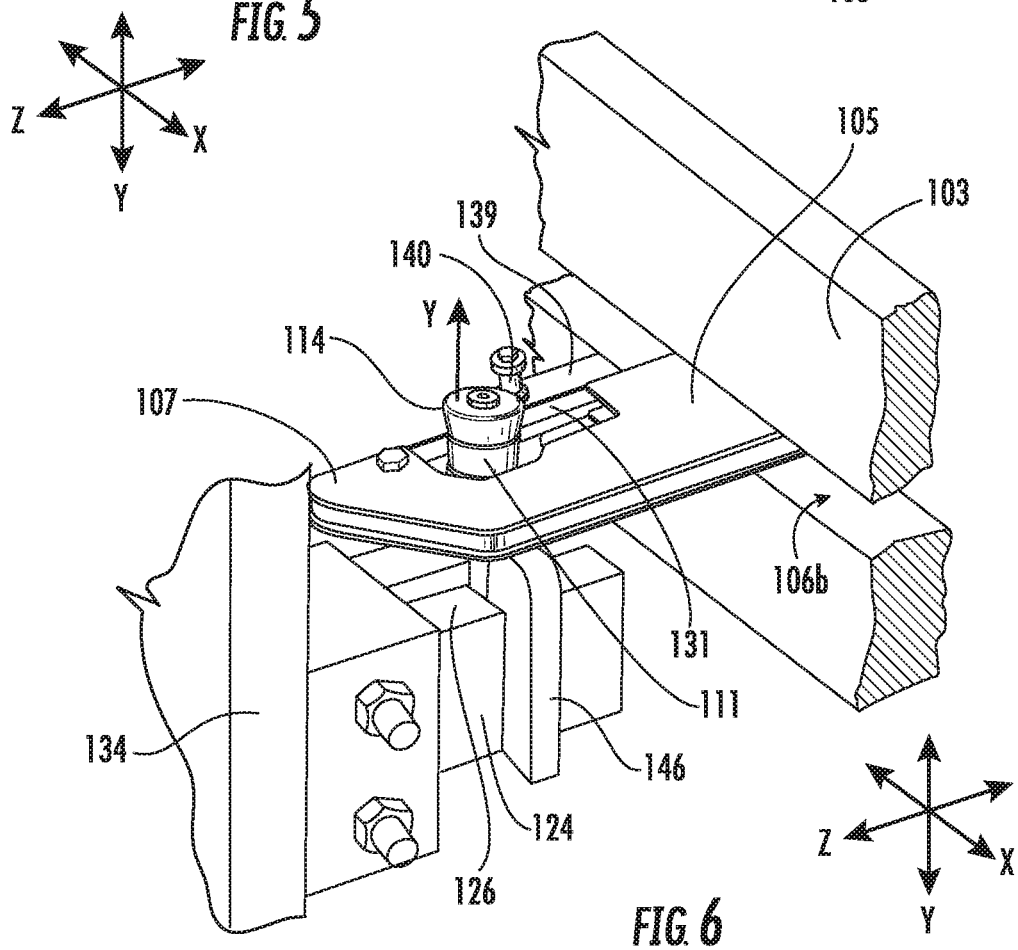
FIG. 6 shows exemplary components of the automatic bale strapping mechanism including the strapping material transport in contact with the strapping material at the carrying end of the inserter rod prior to drawing the strapping material.
Figure 8:
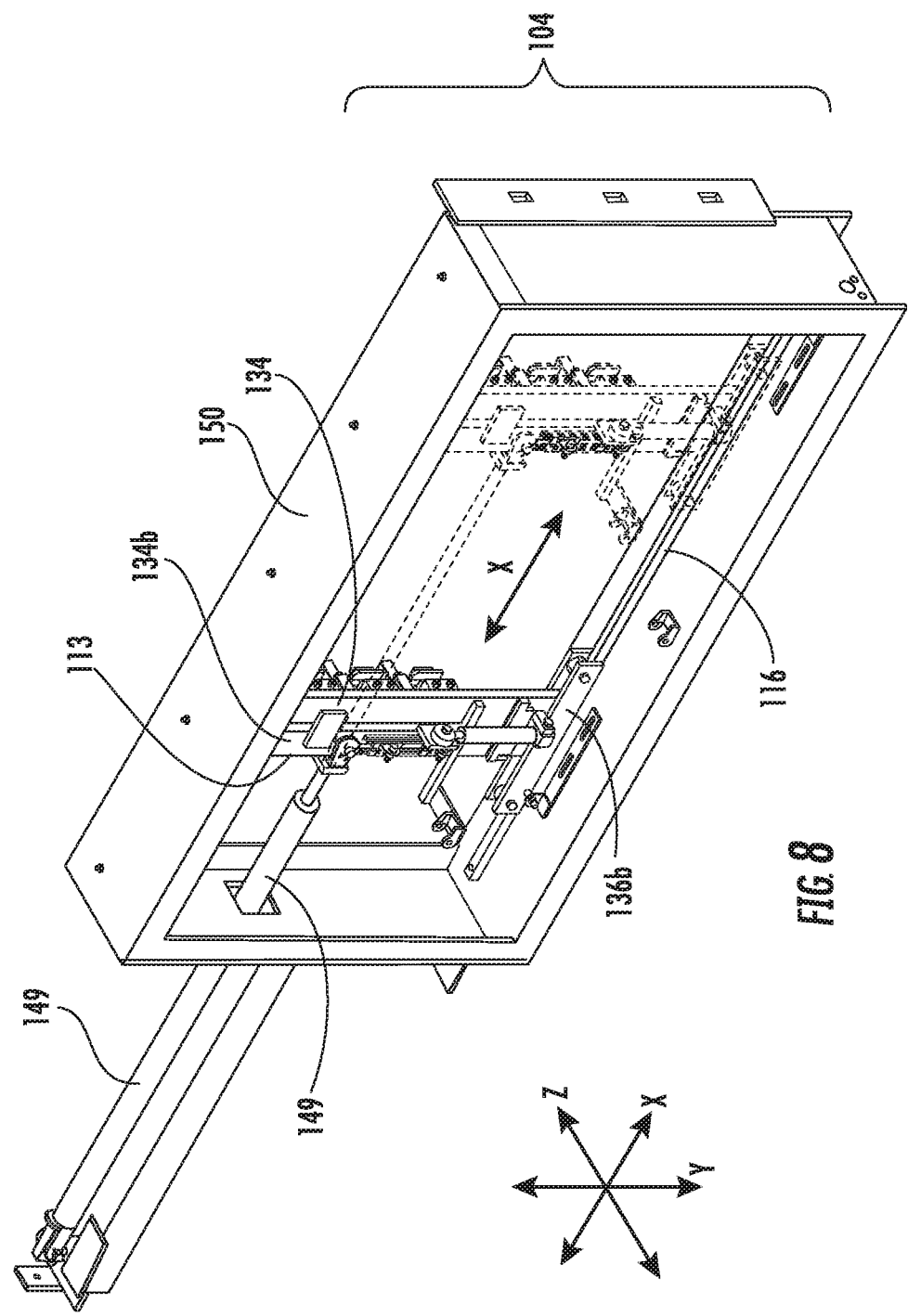
FIG. 8 shows a rear angle perspective of an exemplary mobile draw carriage frame and components of the mobile draw carriage.
Figure 9:
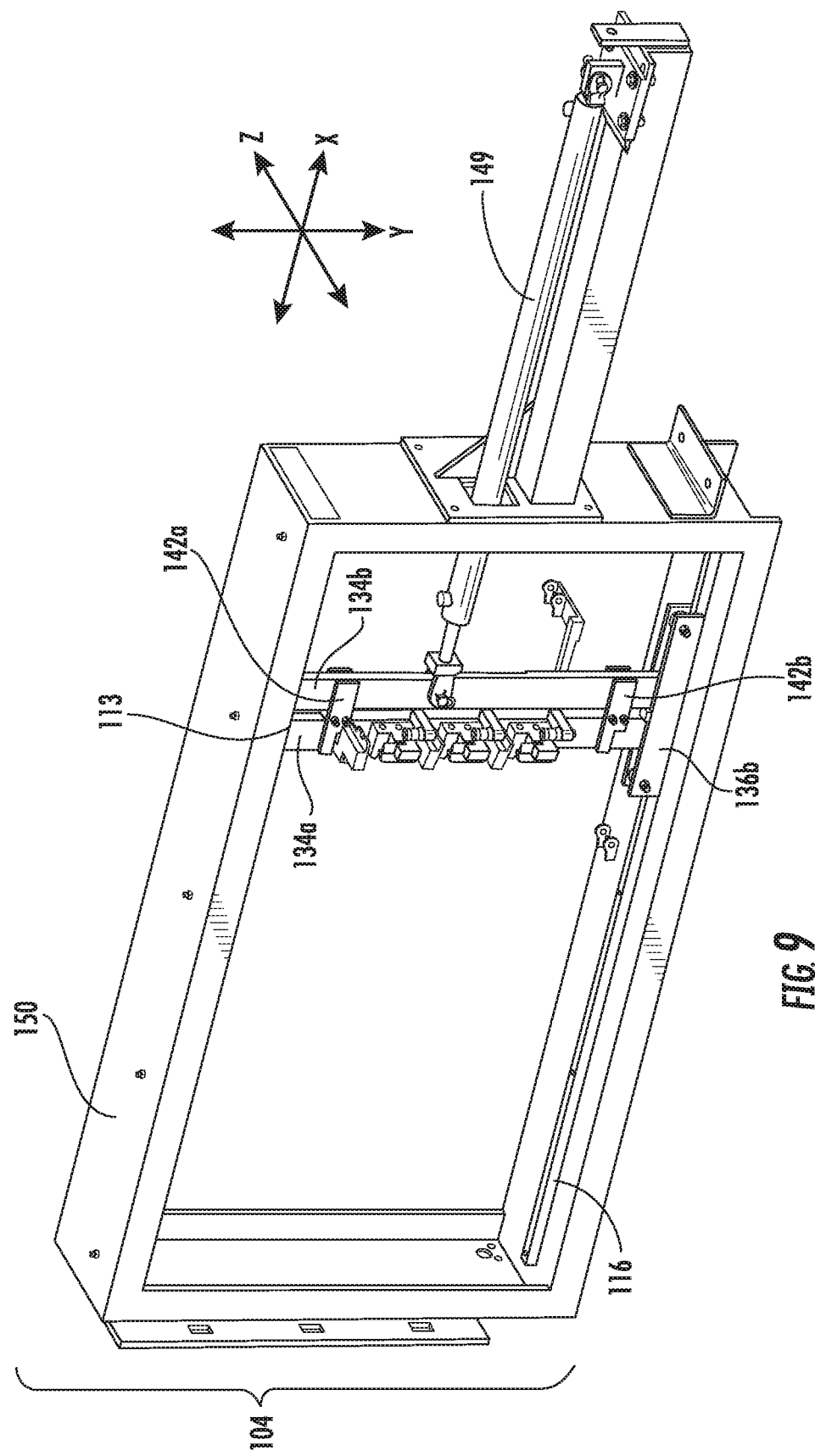
FIG. 9 shows a front angle perspective of an exemplary mobile draw carriage frame and components of the mobile draw carriage.
Figure 10:
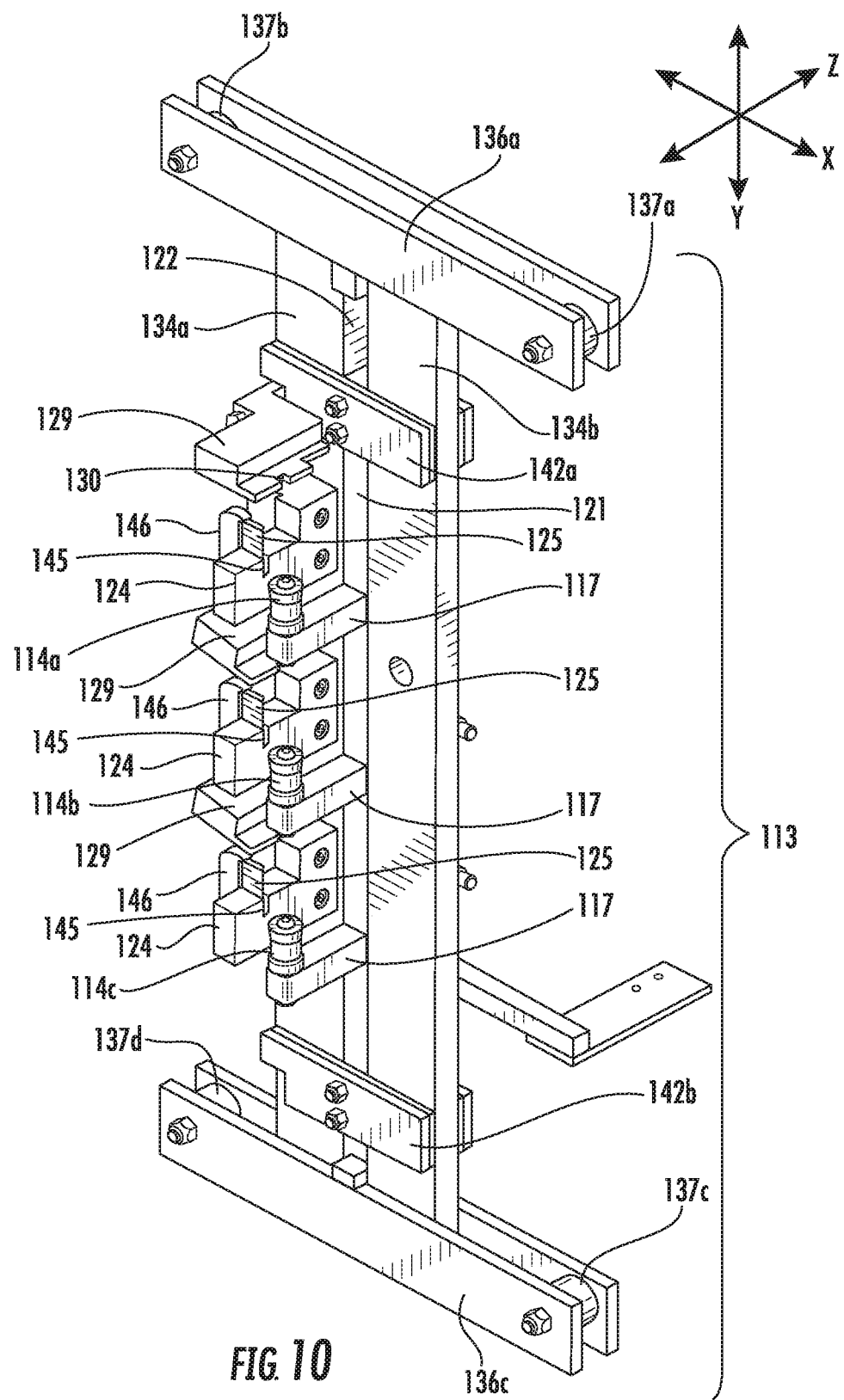
FIG. 10 shows a front angle perspective of an exemplary mobile draw carriage.
Figure 11:
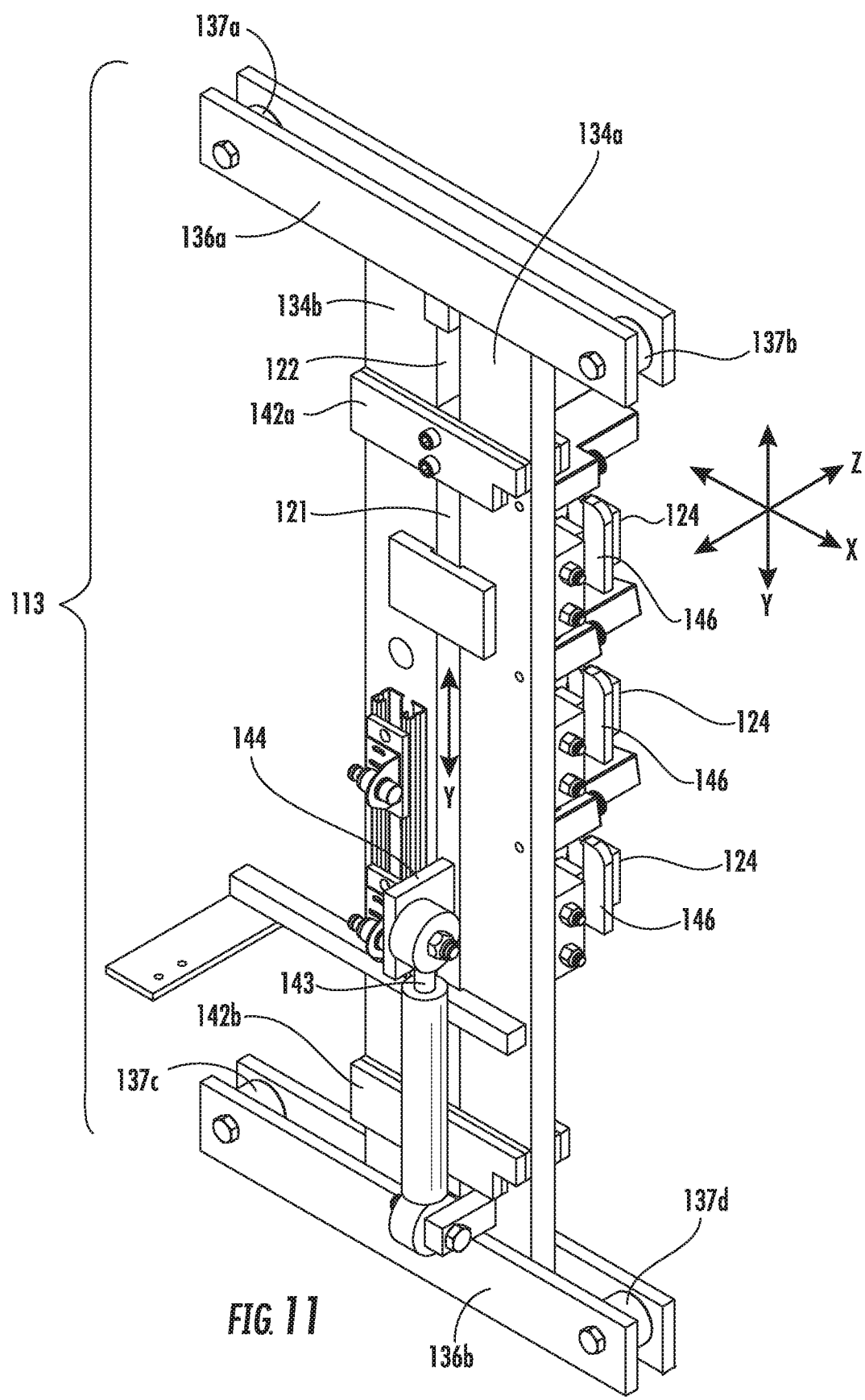
FIG. 11 shows a rear angle perspective of an exemplary mobile draw carriage.
Figure 12:
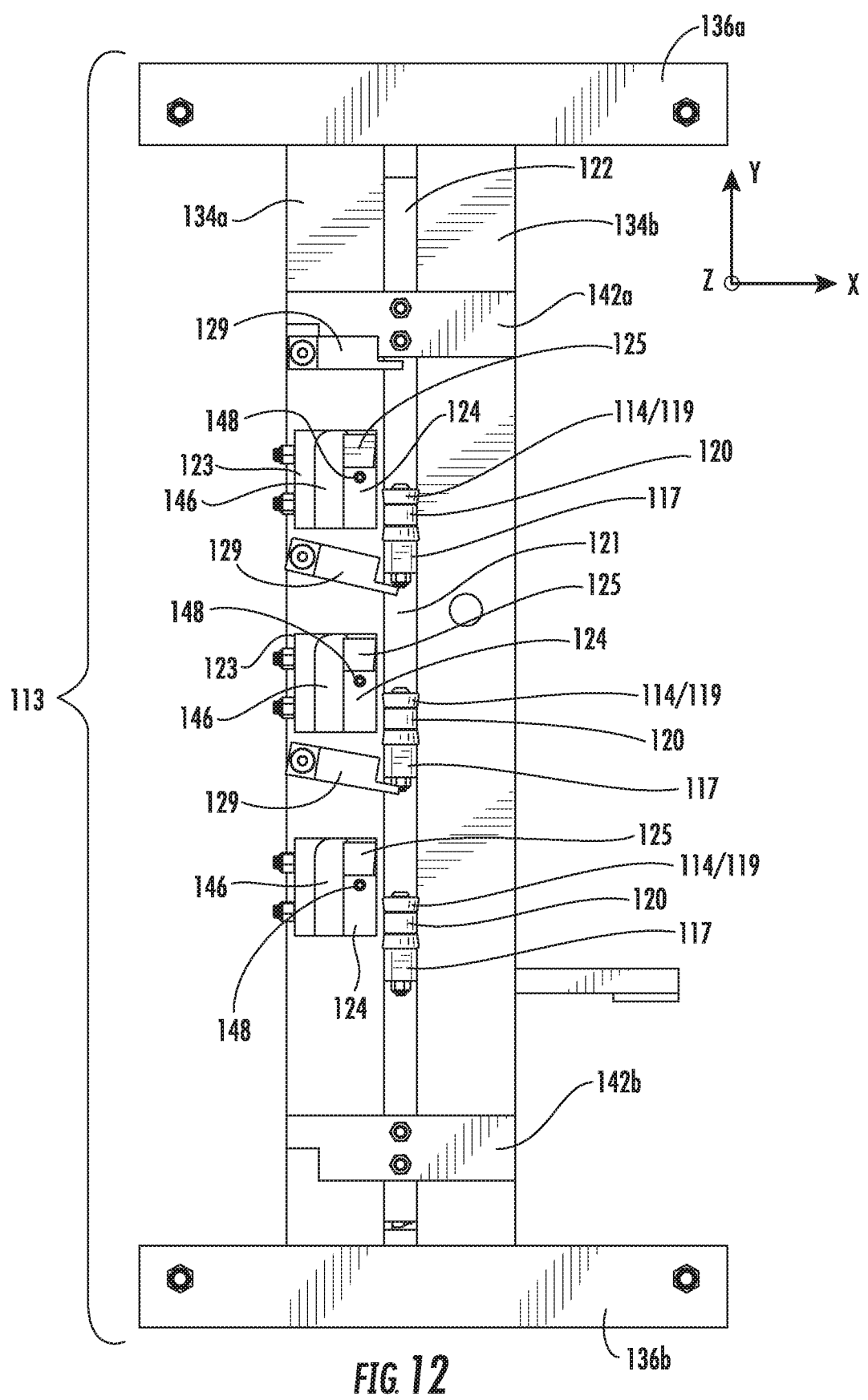
FIG. 12 shows a frontal view of an exemplary mobile draw carriage.
Figure 13:
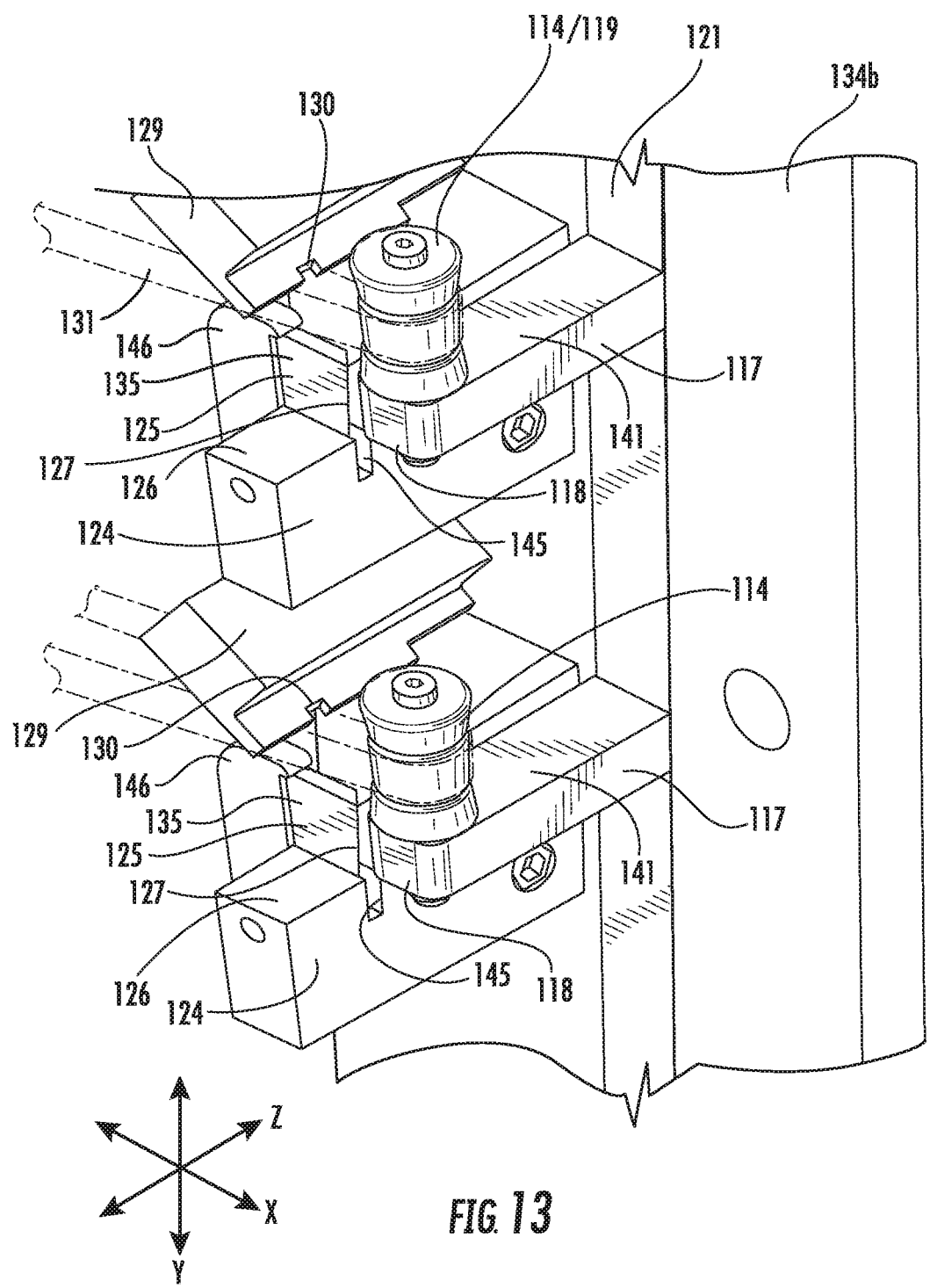
FIG. 13 shows exemplary components of the automatic bale strapping mechanism including the strapping material transport in contact with the strapping material after drawing it a distance (D) prior to transfer of strapping material to cutter blade.
Figure 14:
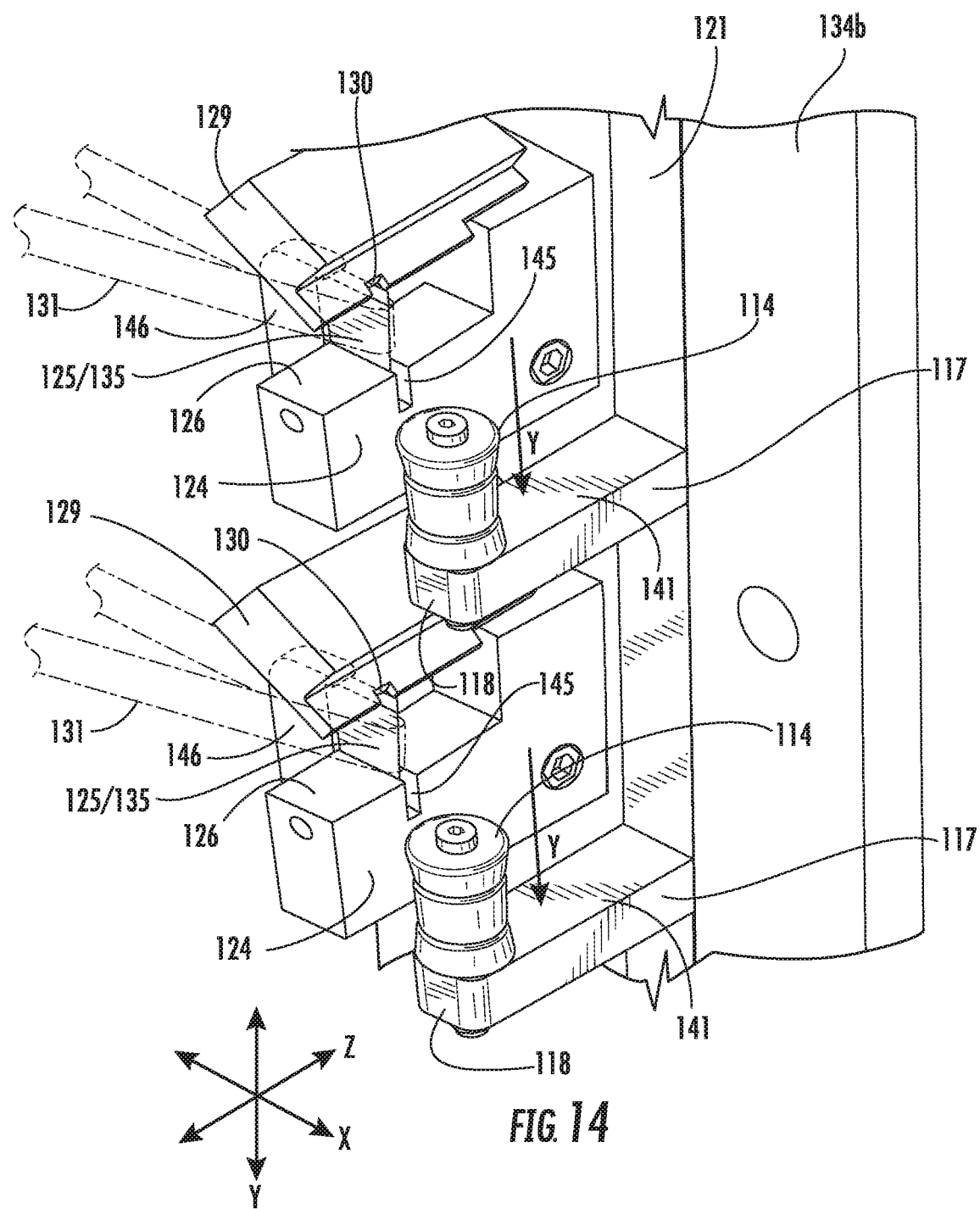
FIG. 14 shows exemplary components of the automatic bale strapping mechanism following transfer of strapping material from strapping material transport to cutter blade and engagement of strap retaining block with cutter blade.

Referring now to FIGS. 2 and 4-16, the automatic bale strapping assembly can further contain a draw and cutter assembly 104 for engaging the strapping material once it has been presented on the opposite side of the extrusion chamber chute 103 out aperture 106b and becomes accessible to the draw and cutter assembly 104. As best shown in FIG. 6, the draw and cutter assembly 104 engages the strapping material at notch 111 and pulls or draws the strapping material a predetermined distance (draw distance (D)) away from apertures 106b. Draw distance (D) is fully adjustable and determined by the intended dimension (e.g., length) of the bale being formed and the expected length of strapping material needed to adequately secure the bale. With reference to FIGS. 10-12, in one embodiment, the draw mechanism contains a mobile draw carriage 113 which may further comprise at least one (or a plurality of) strapping transport 114 that engages the strapping material at the clearance produced by notch 111. In the embodiment best illustrated in FIG. 12, the mobile draw carriage 113 contains three strapping transports 114 equally spaced apart along the vertical axis y. In this embodiment, the mobile draw carriage 113 is also oriented along the vertical axis y. In one embodiment, mobile draw carriage 113 is supported by a mobile draw carriage frame 150 as shown in FIGS. 2, 8-9 and moves alongside the baling press extrusion chamber chute along one or more carriage tracks 116 affixed to frame 150. The embodiment shown in FIG. 8 comprises two carriage tracks 116 (although the top track 116 is not shown) which are engaged by, in this embodiment, guides 136a-b (best illustrated in FIGS. 10-12) affixed to the ends of the main vertical support 134. Track guides 136a-b may comprise rollers 137a-b which roll upon carriage tracks 116. In the embodiment shown in FIG. 8, the motion of the mobile draw carriage 113 is along the horizontal plane x and kept on plane by the carriage tracks 116. In some embodiments, the movement of mobile draw carriage is coplanar with the exterior vertical wall of the extrusion chamber chute of the baling press. The motion of the mobile draw carriage 113 along carriage tracks 116 is powered by any suitable means, for example electrically, hydraulically, or pneumatically. The movement can further be mechanically driven by hydraulic ram assembly 149 as shown in the illustrated embodiments, or by a chain and sprocket assembly, or the like.

In the embodiment illustrated in FIGS. 4-7, the draw and cutter assembly 104 can additionally include one or more guide elements 138 which engage the strapping material as it is drawn to distance D. Guide elements 138 help to avoid unwanted contact between strapping material and other nearby abrasive surfaces. In the embodiment illustrated in FIGS. 4-7, the guide elements 138 are affixed to the side wall of extrusion chamber chute proximate the aperture (e.g., 106b). Guide elements 138 may comprise an arm 139 affixed to the extrusion chamber chute and a post 140 which engages the strapping material as it is being drawn. Post 140 can be comprised of a substantially non-abrasive material. Post 140, in some embodiments, captures the strapping material so that it does not walk up or down and remains in place. For example, post 140 can include a track and flange design similar to the strapping material support 108 described above.

Referring now to FIGS. 5-7 and 13-14, in one embodiment, the strapping transport 114 is affixed to a transport post 117, which itself is affixed to a main vertical support 134 of the mobile draw carriage 113 extending along the horizontal axis toward the outer wall of the extrusion chamber chute. In some embodiments, the strapping transport 114 is positioned on an upper surface 141 of transport post 117 at the terminal end 118 (or the end closest to the extrusion chamber chute exterior wall) extending upward along a vertical plane y. In another embodiment, the strapping transport 114 comprises a roller 119 which, in some embodiments, contains a surface made of a non-abrasive material, for example polyethylene (e.g., UHMW-PE), polypropylene, polyester, nylon, or a blend thereof. Alternatively, roller 119 can be solid steel. In one embodiment, cam rollers with bearings are used. In operation, the strapping transport 114 provides a substantially non-abrasive surface 120 upon which the strapping material rests while the strapping material is drawn rearward a draw distance (D). In another embodiment, the strapping transport 114 rotates upon a shaft (not shown) while the strapping material is drawn rearward, which further reduces friction and unwanted abrasion.

With reference to the embodiment best illustrated in FIGS. 5-7, 13-14, and 15, transport post 117 moves upward and downward along the vertical axis y independently of the remainder of the vertical main support 134 of the mobile draw carriage 113 which does not move along the vertical axis y. As shown in FIGS. 10-12 and 15, transport post 117 can be mounted to a slide bar 121 and positioned and secured within a slot or gap 122 between two vertical supports 134*a-b* of the mobile draw carriage 113 through which the slide bar 121 travels upward and downward. In the embodiment shown in FIG. 12, braces 142*a-b* hold the slide bar 121 in place between gap 122 and move along with the slide bar 121. In some embodiments, the vertical motion of slide bar 121 through gap 122 is electrically, pneumatically, or hydraulically powered. Movement can be mechanically driven by hydraulic ram or cylinder assembly, chain and sprocket assembly, an air cylinder, or the like. In the embodiment shown in FIG. 11, movement of slide bar 121 is driven by a hydraulic cylinder assembly 143 affixed to a fin 144 positioned on slide bar 121.

Figure 7:
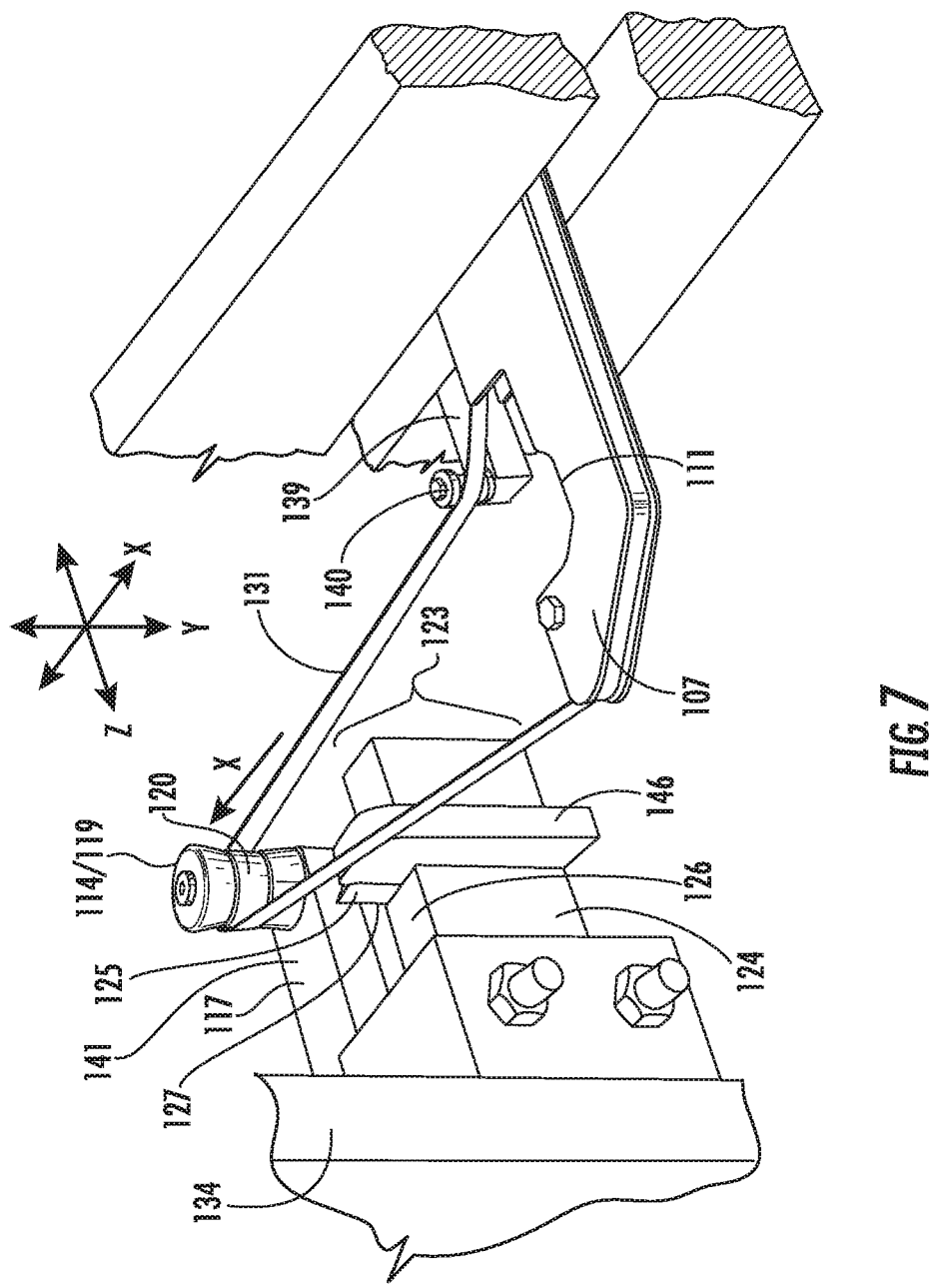
FIG. 7 shows exemplary components of the automatic bale strapping mechanism including the strapping material transport in contact with the strapping material and drawing it away from the carrying end of the inserter rod toward a distance (D).
Figures 15, 16:
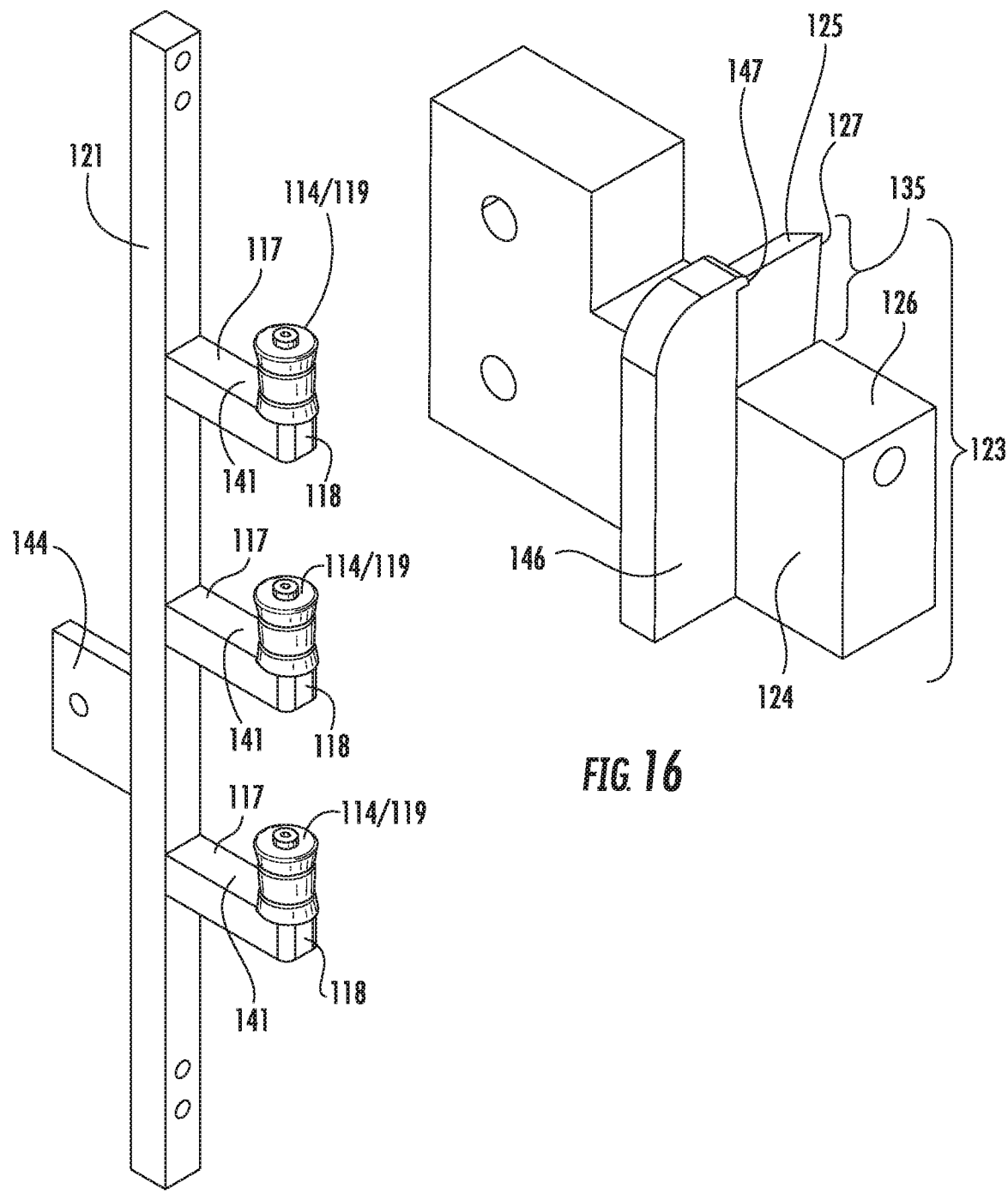
FIG. 15 shows an exemplary slide bar with three transport posts and a fin.
FIG. 16 shows an exemplary block support for cutter blade.

With continued reference to the embodiment illustrated in FIGS. 7, 12, and 16, the vertical main support 134 of mobile draw carriage 113 can further contain one or more cutter assemblies affixed thereto, shown in the embodiment as 123. In one embodiment, cutter assemblies 123 are stationary (do not move) in relation to the vertical main support 134. Each cutter assembly 123 can contain a block support 124 extending along the horizontal axis z toward the outer wall of the extrusion chamber chute of a baling press. In some embodiments, the cutter assemblies contain a strapping cutter blade 125 affixed to block support 124 with a top portion 135 of the cutter blade 125 exposed above the upper surface 126 of block support 124. A bottom portion of cutter blade 125 may be housed within a groove 145 defined within the upper surface 126 of the block support 124. In one embodiment, the exposed top portion 135 is large enough such that the sharp edge 127 may fully engage the flat surface of the strapping material. In another embodiment, the sharp edge 127 of cutter blade 125 is oriented rearward toward the aft end of the baling press (along horizontal plane X)— the direction opposite the movement of the advancing and forming bale. Also, in another embodiment, cutter blades 125 are affixed to the mobile draw carriage at positions substantially co-planer (or, alternatively, slightly below) with the inserter shafts 105 and notch 111 of strapping material support 108. In another embodiment, the cutter blade 125 is further supported and held in the proper vertical orientation by a cutter blade brace 146, which engages the blade 125 and the block support 124. In some embodiments, cutter blade brace 146 is mounted to block support 124 (via weld, screws, rivets, or the like) and comprises one or more features designed to secure the cutter blade in position, for example, lip 147, which prevents the blade from sliding upward. Other cutter blade securing features may be included, for example, a set screw 148 positioned within block support 124 that engages cutter blade 125.

In one embodiment (illustrated in FIG. 12), transport post 117 is positioned slightly aft (e.g. behind or toward the rear of the baling press) of the block support 124. The transport post 117 may also be proximate the cutter blade 125 to improve accuracy of the intended transfer of the strapping material from transport 114 to cutter blade 125. For example, in one embodiment, the transport 114 is less than 0.25" from the cutter blade 125. The transport post 117 may have a pick-up position (A) (best illustrated in FIGS. 6-7 and 13) along the vertical axis wherein the transport 114 is slightly above the cutter blade 125, which is the position that engages the strapping material upon presentation and draws it rearward. The transport post 117 can have a drop position (B) (best illustrated in FIGS. 5, 12 and 14 along the vertical axis wherein the transport 114 is beneath the upper flat surface 126 of the block support 124. Vertical movement of the transport post 117 from position (A) to position (B) via slide bar 121 causes strapping material to transfer from transport 114 to cutter blade 125 as the strapping material is forced off the transport 114 via contact with block support 124.

Vertical movement of the transport post 117 from position (B) to position (A) permits transport post 117 to lift (via slide bar 121 powered vertical motion) and position strapping transport 114 within notch 111 of strapping material support 108 between the strapping material and solid surfaces of strapping material support 108. In operation, once the strapping material is in contact with transport 114, mobile draw carriage 113 is actuated aft along horizontal plane x to draw the strapping material under tension the preferred draw distance (D). Upon arrival at the draw distance (D) mobile draw carriage 113 stops, and transport post 117 lowers (via slide bar 121 powered vertical motion) thereby lowering transport 114 which is carrying the strapping material. In one embodiment, transport post's lowest position is not on plane with upper surface 126 of block support 124. For example, in the embodiment shown in FIG. 14, transport post's lowest position is slightly beneath the bottom surface 127 of block support 124, while the top 128 of transport 114 is just below the upper surface 126 of block support 124. Furthermore, in this embodiment, transport 114's central axis (G) which corresponds to shaft's position, is in vertical alignment with cutter blade 125. The positioning of structural components—transport post 117, block support 124, transport 114, and cutter blade 125 in relation to one another—helps ensure precise transference of the strapping material from the transport 114 to the sharp edge 127 of cutter blade 125 as the transport post 117 is lowered which results when the strapping material contacts upper surface 126 of block support 124 forcing the strapping material off of the transport 114. Tension in the strapping material forces a flat, firm contact with the cutter blade 125 subjecting substantially all of the strapping material surface area (on one flat side) to the sharp edge 127 of cutter blade 125.

The amount of tension necessary to successfully and repeatedly transfer the strapping material to the cutter blade 125 without prematurely cleaving the strapping material while also holding the strapping material in the proper position upon cutter blade 125 is a controllable parameter. Maintaining the proper tension on the strapping material is very important. In some embodiments, the strapping material is drawn a distance (D) prior to reversing the inserter rod(s) back through the extrusion chamber chute, which helps to keep tension on the strapping material.

As best illustrated in FIGS. 10, 12, and 13-14 embodiment, mobile draw carriage 113 includes a strap retaining block 129 positioned above block support 124 and cutter blade 125. In some embodiments, strap retaining block 129 has the following primary functions: operator safety, applying pressure to the strapping material to force it down upon the cutter blade during transference, and helping to maintain the strapping material's position on the cutter blade 125. In one embodiment, the strap retaining block 129 includes a blade notch 130 where the top of the cutter blade 125 is positioned preventing unwanted upward movement of strapping material once it is in contact with the cutter blade 125. Cutter blade's position within notch 130 helps ensure that the strapping material is pushed down sufficiently upon the cutter blade 125. In one embodiment, strap retaining block 129 embeds a weight (not shown). In one embodiment, the strap retaining block 129 is pivotably affixed to the vertical main support 134 (in the embodiment illustrated in FIG. 10, it is affixed to 134a). In another embodiment, the strap retaining block 129 has an upper position wherein the blade guard 129 rests upon the strapping material as it is being drawn distance (D). In the upper position, strap retaining block 129 is substantially clear of the cutter blade 125 for unobstructed transference of strapping material from strapping transport 114 to cutter blade 125. Once transference occurs, strap retaining block 129 pivots to its lower position wherein notch 130 contacts the top of the cutter blade 125. In this position, strap retaining block 129 applies downward pressure on strapping material to ensure that the strapping material is positioned below the top of the cutter blade 125 for cleaner and more precise cutting.

It should be noted, that when the strapping material 131 is transferred to the cutter blade 125, it is under an initial tension that is insufficient to cleave the strapping material but sufficient to hold the strapping material in position on the sharp edge 127 of cutter blade 125. The tension in the strapping material 131, which remains in contact with the forming bale contained within the extrusion chamber chute, is increased as the forming bale (or a charge of material being baled) is advanced within the extrusion chamber chute 103 by a ram platen or otherwise. When the tension has reached a critical point, the cutter blade 125 automatically cuts the strapping material 131 to the proper size for securing or binding the forming bale. Again, the strapping material 131 is cleaved automatically due to the increased tension between strapping material 131 and sharp edge 127 of the cutter blade(s) 125 as the charge progresses forward through the extrusion chamber chute 103. The tension between cutter blade 125 and strapping material 131 increases because a portion of the strapping material 131 remains in direct contact with the charge or bale and thus, advances forward as the bale advances forward.

In some embodiments, the strapping material 131 is stored, dispensed, and inserted from a single side of the baling press (e.g., the opposite side of the extrusion chamber chute from the draw and cutter assembly). Prior to insertion of the inserter shaft 105, which carries the strapping material through the extrusion chamber chute, advancement of the forming bale or charge through the extrusion chamber chute 103 is paused. The ram (or other structure applying force to the aft side of the forming bale) may then be reversed slightly producing gap or cavity large enough to provide clearance for inserter shaft 105 advancement through extrusion chamber chute 103. Once inserter shaft 105 presents the strapping material 131 through aperture 106b on the opposite wall 132 of the extrusion chamber chute 103, the mobile draw carriage 113 has drawn the strapping material 131 draw distance (D), and the strapping material 131 has been placed upon the cutter blade(s) 125, power is applied to the ram to advance the baling material charge forward and, as the charge advances forward, the tension between the strapping material 131 increases until the strapping material is cut.

Because the strapping material 131 is stored, dispensed, and inserted from a single side of the baling press in this embodiment, the strapping material is cut into two sections to connect strap ends on bales further down the extrusion chamber chute nearer the bale exit end. For example, the end of the cut strap nearest the bale exit end provides strapping the proper length to connect to the rear (last section of bale formed) of the leading bale, and the end of the strap cut nearest the ram (or rear of the baling press) provides the strap the proper length to connect to the front (leading edge of next bale to be formed within the extrusion chamber), or the trailing bale. Said procedure allows connecting the straps to secure bale density of a single bale even though strap was inserted on two occasions for each bale, once for leading end of bale and once for trailing end of bale. The advantages of this method include securing strapping 360-degrees around the entire bale perimeter (circumference), permitting strapping dispensing and insertion from only one side of the baling press, presenting only one location of overlapping straps to be connected, and allowing the baling press operator to work on only one side of the baling press.

Notably all of the operations (including precise timing of each) including ram pause, ram reversal, inserter rod advancement through the extrusion chamber chute carrying the strapping material, mobile draw carriage operation, and ram/charge advancement may be performed automatically with no user or operator involvement. The operations may be fully computer implemented and algorithmically programmed and controlled via computer. A user would then only need to input the parameters, such as draw distance (D), ram pause interval, via computer into the software and then press start.

While the present invention has been described herein with respect to the exemplary embodiments, it will become apparent to one of ordinary skill in the art that many modifications, improvements and sub-combinations of the various embodiments, adaptations and variations can be made to the invention without departing from the spirit and scope thereof.

What is claimed is:
1. An automatic bale strapping mechanism comprising:
 a strapping insertion assembly comprising at least one inserter shaft that carries strapping material through an extrusion chamber chute of a baling press;
 wherein said at least one inserter shaft comprises a carrying end that engages the strapping material and wherein said carrying end comprises a strapping mate- rial support that holds the strapping material in position at the carrying end during travel through said extrusion chamber chute;
a draw and cutter assembly comprising a mobile draw carriage and a mobile draw carriage frame for supporting said mobile draw carriage; and
wherein said mobile draw carriage comprises a main vertical support and wherein said mobile draw carriage frame comprises at least one track in motile engagement with said mobile draw carriage and establishing a horizontal plane along which said mobile draw carriage moves.

2. The automatic bale strapping mechanism of claim 1, wherein said strapping material support comprises a trench upon which said strapping material rests.

3. The automatic bale strapping mechanism of claim 2, wherein said strapping material support comprises two flanges flanking said trench.

4. The automatic bale strapping mechanism of claim 1, wherein said strapping material support comprises a notch that produces clearance between said strapping material and said strapping material support.

5. The automatic bale strapping mechanism of claim 1, wherein said mobile draw carriage comprises a strapping material transport.

6. The automatic bale strapping mechanism of claim 5, wherein said strapping material transport comprises a roller comprising a substantially non-abrasive surface.

7. The automatic bale strapping mechanism of claim 5, wherein said strapping material transport is mounted to a transport post.

8. The automatic bale strapping mechanism of claim 7, wherein the transport post is mounted to a slide bar slidably engaged to the main vertical support of said mobile draw carriage.

9. The automatic bale strapping mechanism of claim 1, wherein said mobile draw carriage comprises a cutter blade.

10. The automatic bale strapping mechanism of claim 9, wherein said cutter blade is fixedly mounted to a cutter block and wherein said cutter block is fixedly mounted to said main vertical support.

11. The automatic bale strapping mechanism of claim 9 further comprising a strap retaining block pivotably attached to said main vertical support.

12. The automatic bale strapping mechanism of claim 11 wherein said strap retaining block comprises a notch within which said cutter blade is positioned when said strap retaining block pivots and engages said cutter blade following transfer of strapping material to the cutter blade.

13. The automatic bale strapping mechanism of claim 11 wherein said strap retaining block is weighted.

14. An automatic bale strapping mechanism comprising:
a strapping insertion assembly comprising at least one inserter shaft that carries strapping material through an extrusion chamber chute from a first exterior side wall to a second exterior side wall of said extrusion chamber chute;
wherein said at least one inserter shaft comprises a strapping material support that holds the strapping material in position during travel through said extrusion chamber chute and wherein said strapping material support comprises a trench which comprises a platform upon which said strapping material rests during travel through the extrusion chamber chute;
a draw and cutter assembly comprising a mobile draw carriage wherein said mobile draw carriage comprises a kinetic transport post which comprises a strapping material transport mounted thereto, a cutter blade block which comprises a cutter blade mounted thereto, and a carriage frame which supports said mobile draw carriage wherein said carriage frame comprises one or more tracks in motile engagement with said mobile draw carriage for establishing a horizontal plane along which said mobile draw carriage moves.

15. The automatic bale strapping mechanism of claim 14, wherein said kinetic transport post is affixed to a slide bar which is slidably engaged to a main vertical support of said mobile draw carriage.

16. The automatic bale strapping mechanism of claim 14, wherein said strapping material transport comprises a first position and a second position along a vertical plane y.

17. The automatic bale strapping mechanism of claim 16, wherein said first position is slightly above the cutter blade and said second position is below said cutter blade in relation to the vertical plane y.

18. The automatic bale strapping mechanism of claim 14, wherein the distance between said strapping material transport and said cutter blade is about 0.25" along the horizontal plane.

19. A method of automatically cutting strapping material used to bind a bale comprising the steps of:
(a) providing an automatic bale strapping mechanism integral to a baling press comprising an extrusion chamber chute, a strapping insertion assembly comprising at least one inserter shaft, and a draw and cutter assembly comprising a mobile draw carriage wherein said mobile draw carriage comprises a strapping material transport, a cutter blade, and a strap retaining block pivotably attached to said mobile draw carriage;
(b) engaging said strapping material to said at least one inserter shaft;
(c) by said at least one inserter shaft, transferring said strapping material through said extrusion chamber chute from a first side to a second side of said extrusion chamber chute and between two adjacent bales positioned within said extrusion chamber chute;
(d) by said at least one inserter shaft, presenting said strapping material to the draw and cutter assembly on the second side of the extrusion chamber chute;
(e) drawing said strapping material an adjustable predetermined draw distance (D) by said draw and cutter assembly;
(f) transferring said strapping material from said strapping material transport to said cutter blade; and
(g) cutting said strapping material by said cutter blade.

20. The method of automatically cutting strapping material of claim 19, further comprising the step of determining a length of said draw distance (D) based on a desired length of said bale prior to step (b).

21. The method of automatically cutting strapping material of claim 19, further comprising the steps of:
pausing advancement of bales being formed within said extrusion chamber chute prior to step (b);
advancing said bales being formed within said extrusion chamber chute prior to step (g); and
wherein said step (g) is due to tension created in the strapping material by said advancement of bales within the extrusion chamber chute.

22. The method of automatically cutting strapping material of claim 19, further comprising the steps of:
resting the strap retaining block upon said strapping material as the strapping material is drawn;

dropping the strap retaining block to contact said cutter blade following transfer of strapping material to said cutter blade;

wherein said strap retaining block comprises a notch within which said cutter blade is positioned upon contact and wherein contact with said notch maintains proper position of said strapping material upon said cutter blade.

* * * * *